US012381359B2

(12) United States Patent
Ahldag

(10) Patent No.: US 12,381,359 B2
(45) Date of Patent: Aug. 5, 2025

(54) PROTECTIVE-EARTHING CONTACT AND CONDUCTOR-CONNECTION TERMINAL

(71) Applicant: WAGO Verwaltungsgesellschaft mbH, Minden (DE)

(72) Inventor: Joerg Ahldag, Rinteln (DE)

(73) Assignee: Wago Verwaltungsgesellschaft MBH, Minden (DE)

( * ) Notice: Subject to any disclaimer, the term of this patent is extended or adjusted under 35 U.S.C. 154(b) by 360 days.

(21) Appl. No.: 17/873,965

(22) Filed: Jul. 26, 2022

(65) Prior Publication Data

US 2022/0360021 A1 Nov. 10, 2022

Related U.S. Application Data

(63) Continuation of application No. PCT/EP2020/083193, filed on Nov. 24, 2020.

(30) Foreign Application Priority Data

Jan. 28, 2020 (DE) ..................... 10 2020 101 986.6

(51) Int. Cl.
*H01R 13/652* (2006.01)
*H01R 4/48* (2006.01)
(Continued)

(52) U.S. Cl.
CPC ........... *H01R 13/652* (2013.01); *H01R 4/489* (2013.01); *H01R 13/17* (2013.01); *H01R 4/48* (2013.01);
(Continued)

(58) Field of Classification Search
CPC ...... H01R 13/652; H01R 4/489; H01R 13/17; H01R 4/48; H01R 4/4809; H01R 4/4821;
(Continued)

(56) References Cited

U.S. PATENT DOCUMENTS 4,895,526 A 1/1990 Henrici et al.
5,626,488 A * 5/1997 Albeck ................ H01R 4/2429 439/441
(Continued)

FOREIGN PATENT DOCUMENTS

CN 201185245 Y 1/2009
CN 207517993 U 6/2018
(Continued)

OTHER PUBLICATIONS

International Search Report dated Feb. 12, 2021 in corresponding application PCT/EP2020/083193.
(Continued)

*Primary Examiner* — Justin M Kratt
(74) *Attorney, Agent, or Firm* — Muncy, Geissler, Olds & Lowe, P.C.

(57) ABSTRACT

A protective earthing contact for connecting a protective earth line with an electrically conductive carrier element in an the electrically conducting manner, wherein the protective earthing contact has a base portion, wherein two side elements project from the base portion and a respective side element has an upper region, wherein the upper regions have a latching region for clamping the protective earthing contact onto the carrier element and wherein at least one side element has a protective earth contact element for making contact to the carrier element in an electrically conducting manner. Each of the upper regions has a contact-making region, wherein the latching region and the protective earth contact element are substantially arranged at the same height in relation to the base portion.

19 Claims, 7 Drawing Sheets

(51) Int. Cl.

| | |
|---|---|
| ***H01R 13/17*** | (2006.01) |
| *H01R 4/58* | (2006.01) |
| *H01R 4/66* | (2006.01) |
| *H01R 9/24* | (2006.01) |
| *H01R 11/05* | (2006.01) |
| *H01R 13/15* | (2006.01) |
| *H01R 13/187* | (2006.01) |
| *H01R 13/648* | (2006.01) |

(52) U.S. Cl.

CPC .......... *H01R 4/4809* (2013.01); *H01R 4/4821* (2023.08); *H01R 4/483* (2023.08); *H01R 4/484* (2023.08); *H01R 4/4846* (2023.08); *H01R 4/4848* (2023.08); *H01R 4/485* (2023.08); *H01R 4/58* (2013.01); *H01R 4/66* (2013.01); *H01R 9/2483* (2013.01); *H01R 11/05* (2013.01); *H01R 13/15* (2013.01); *H01R 13/187* (2013.01); *H01R 13/648* (2013.01)

(58) Field of Classification Search

CPC ...... H01R 4/483; H01R 4/484; H01R 4/4846; H01R 4/4848; H01R 4/485; H01R 4/58; H01R 4/66; H01R 9/2483; H01R 11/05; H01R 13/15; H01R 13/187; H01R 13/648

See application file for complete search history.

(56) References Cited

U.S. PATENT DOCUMENTS

| | | | | |
|---|---|---|---|---|
| 7,686,626 B2 * | 3/2010 | Wu | ...................... | H01R 9/2691 439/95 |
| 2009/0176389 A1 | 7/2009 | Wu et al. | | |
| 2019/0296508 A1 | 9/2019 | Bouchard et al. | | |

FOREIGN PATENT DOCUMENTS

| | | | |
|---|---|---|---|
| CN | 109728460 | A | 5/2019 |
| DE | 202008010347 | U1 | 10/2008 |
| DE | 202008017145 | U1 | 3/2009 |
| DE | 202018101445 | U1 | 5/2018 |
| EP | 0327703 | A2 | 8/1989 |
| GB | 1308850 | A | 3/1973 |
| JP | H07-142104 | A | 6/1995 |
| JP | H07-302629 | A | 11/1995 |

OTHER PUBLICATIONS

International Preliminary Report on Patentability dated Aug. 11, 2022 in corresponding application PCT/EP2020/083193.

Japanese Office Action for Japanese Patent Application No. 2022-545333 mailed on Oct. 11, 2024.

* cited by examiner

PROTECTIVE-EARTHING CONTACT AND CONDUCTOR-CONNECTION TERMINAL

This nonprovisional application is a continuation of International Application No. PCT/EP2020/083193, which was filed on Nov. 24, 2020, and which claims priority to German Patent Application No. 10 2020 101 986.6, which was filed in Germany on Jan. 28, 2020, and which are both herein incorporated by reference.

BACKGROUND OF THE INVENTION

Field of the Invention

The present invention relates to a protective earthing contact for connecting a protective earth line to an electrically conductive carrier element in an electrically conducting manner, wherein the protective earthing contact has a base portion, wherein two side elements project from the base portion and a respective side element has an upper region, wherein the upper regions form a latching region for clamping the protective earthing contact onto the carrier element and wherein at least one side element has a protective earth contact element for making contact with the carrier element in an electrically conducting manner.

Furthermore, the invention relates to a conductor connection terminal having a housing with a busbar, with a spring force terminal connection, wherein the busbar and the spring force terminal connection form a clamping point for an electrical conductor to be clamped, and with an above-mentioned protective earthing contact for connecting the protective earth line to the busbar in an electrically conducting manner, wherein the protective earthing contact has a base portion, wherein two side elements project from the base portion and a respective side element has an upper region, wherein the upper regions form a latching region for clamping the protective earthing contact onto the busbar and wherein at least one side element has a protective earth contact element for making contact with the carrier element in an electrically conducting manner.

Description of the Background Art

In power supply connectors, a protective earthing contact is a mandatory requirement. Such protective earthing contacts must be securely mounted and functional. A disadvantage that arises from this is the greater overall height of the power supply connector, which, in particular in the lighting industry, is limited by further built-in parts of a luminaire. A further disadvantage can arise if with a repeated installation of the same protective earthing contact, whereby the possibly tinned contact surfaces can be damaged, safe functioning of the protective earthing contact cannot be guaranteed with repeated installation.

SUMMARY OF THE INVENTION

It is therefore an object of the present invention to create an improved protective earthing contact. Furthermore, it is an object of the present invention to create an improved conductor connection terminal.

In the case of generic protective earthing contacts, it is proposed that in each case one of the upper regions has a contact-making region, wherein the latching region and the protective earth contact element are arranged substantially at the same height in relation to the base portion.

By separating the latching region and the protective earth contact element, risk of damage to the protective earth contact element is reduced. When the protective earthing contact is mounted, the upper regions in the latching region widen so that the carrier element can get between the contact-making regions. By arranging the protective earth contact element at the same height as the latching region in relation to the base portion, the protective earth contact element also widens to the same extent as the upper regions, so that the protective earth contact element can be guided past a contact region of the carrier element without contact. Once the carrier element has been completely guided between the contact-making regions, the upper regions jump back to the starting position and clamp the protective earthing contact to the carrier element. At the same time, the protective earth contact element also jumps back to its original position and contacts the contact region of the carrier element.

The latching region is the region in which the carrier element is guided between the contact-making regions of the protective earthing contact. The carrier element is held in the position between the contact-making regions after being guided. The contact-making regions are therefore directly adjacent to the latching region.

The term widening can be understood to be an elastic deformation of the side elements, in particular the upper regions of the side elements. An elastic deformation occurs under the action of force on the side elements, wherein when the acting force disappears, the side elements return to their original shape without any deformation remaining.

The upper region is the region of a side element that is arranged at the end of the side element facing away from the base portion. The upper region and the base portion are thus arranged at opposite ends of the respective side element.

Substantially at the same height means in particular that the protective earth contact element and the latching region do not have to be exactly the same height in relation to the base portion. A use according to the invention is also given with a deviation of +−15% in relation to the height of the protective earth contact element and the height of the latching region.

The height is the length that exists in the longitudinal extension direction of the side elements, both between the base portion and the latching region and between the base portion and the protective earth contact element.

At least one of the upper regions may have a chamfer in the region of the latching region, wherein the end of the chamfer facing the contact-making regions and the protective earth contact element are substantially arranged at the same height in relation to the base portion.

The chamfer makes it easier to guide the carrier element between the contact-making regions. In addition, the side elements in the region of the upper regions widen continuously, without having to use much force to guide the carrier element between the contact-making regions.

The protective earth contact element can be formed with the carrier element for a force-locked connection.

The force-locked connection contacts the protective earth contact element securely on the carrier element and thus on a corresponding protective earth line. A force-locked connection can be achieved, for example, by the fact that the protective earth contact element must first be guided past the contact region of the carrier element during assembly. Contacting the protective earthing contact without widening the protective earth contact element by a guide of the carrier element between the contact-making regions is thus not possible. The protective earth contact element no longer returns to its original starting position but contacts the contact region of the carrier element in a force-locked manner.

The protective earthing contact may have a retaining element for the form-fitting connection of the protective earthing contact in the assembled state with the carrier element. Furthermore, it is advantageous if the retaining element is arranged on the upper region of the side element. The overall height between the latching region and the retaining element can be smaller than the height between the latching region and the base portion.

This means, for example, that the overall height between the latching region and the retaining element is a maximum of 90%, but at least a maximum of 50% smaller than the height between the latching region and the base portion. This has the advantage that the protective earthing contact can be installed in conductor connection terminals without them having to be designed larger.

The retaining element secures the protective earthing contact against tilting when mounted. The retaining element can, for example, engage in a recess on the carrier element in order to connect the protective earthing contact with the carrier element in a form-fitting manner. The protective earthing contact is secured against tilting after installation. However, the retaining element can also engage, for example, in a fork of the carrier element in order to additionally contact the carrier element in the region of the retaining element. However, it is also conceivable that the retaining element interacts with other components other than the carrier element in order to secure the protective earthing contact against tilting.

It is also conceivable that the retaining elements have additional protective earth contact elements in order to improve the electrically conducting connection between the protective earth conductor and the electrically conductive carrier element.

It has been shown that above all, efficient securing is achieved with two retaining elements, wherein in each case a retaining element is arranged on a side element. The retaining elements can project in opposite directions from the respective side element in order to secure the protective earthing contact against tilting.

It is conceivable that the retaining element may represent an independent subject of the invention, wherein the retaining element for the form-fitting connection engages in a recess of the carrier element so that a protective earthing contact can also be provided, which has such a retaining element, but wherein the latching region and the protective earth contact element are not substantially arranged at the same height in relation to the base portion. This would result in a protective earthing contact as, for example, described below.

Thus, the invention also relates to a protective earthing contact for connecting a protective earth line with an electrically conductive carrier element in an electrically conducting manner, wherein the protective earthing contact has a base portion, wherein two side elements project from the base portion and a respective side element has an upper region, wherein the upper regions form a latching region for clamping the protective earthing contact onto the carrier element and wherein at least one side element has a protective earth contact element for making contact with the carrier element in an electrically conducting manner, wherein the protective earthing contact has a retaining element for the form-fitting connection of the protective earthing contact in the assembled state with the carrier element.

At least one of the side elements can have a guide contour for guiding an electrical conductor. Furthermore, it is advantageous if the upper region is formed as a guide contour or the guide contour is arranged at least on the upper region.

In this way, the mounted protective earthing contact, for example in a conductor connection terminal, can simultaneously fulfill the additional function of a conductor guide. This can be realized, for example, by arc-shaped upper regions, wherein an electrical conductor comes into contact with an arc-shaped upper region and can thus be guided into the correct position in the conductor connection terminal.

On the upper regions, a contact stop can be arranged to stabilize the protective earthing contact in the assembled state. Furthermore, it is advantageous if the contact stops project diagonally from the upper regions. Diagonally means in particular that the latching elements do not project from the upper regions at an angle of 0° or 180°, but project at an angle between −90° and 90°, in particular at an angle of −45°/45° (in a 360° system). It is also possible that the contact stops project in the opposite angle orientation, i.e., −45° and 45° from the respective upper region.

The contact stops stabilize the protective earthing contact when mounted. Stabilized means that a movement of the protective earthing contact in the assembled state is restricted and/or reduced in certain spatial directions. The protective earthing contact is thus held in the position on the carrier element that is appropriate to its use.

By tilting the contact stops, the protective earthing contact is additionally secured against tilting by achieving a more favorable distribution of the surface of the contact stops in relation to the carrier element. The contact stops can project from the respective upper region in such a way that the contact stops are substantially aligned parallel to each other. Parallel means, in particular, that the contact stops can be arranged in alignment on a common imaginary line.

A conductor connection terminal of the type mentioned above may be equipped with an above-described protective earthing contact.

In the case of the generic conductor connection terminal, it is proposed that the latching region and the protective earth contact element are substantially arranged at the same height in relation to the base portion. In this case, at least one of the upper regions may have a chamfer in the region of the latching region, wherein the end of the chamfer facing the contact-making regions and the protective earth contact element are arranged at the same height in relation to the base portion.

At least one of the side elements may have a guide contour for guiding the electrical conductor into the housing. The guide contour can be arranged on the upper region of the side element. Furthermore, it is advantageous if the guide contour interacts with the housing and/or with a conductor stop for the electrical conductor in such a way that the protective earthing contact is stabilized.

For example, it is conceivable that the guide contours rest on the housing or on the conductor stops in such a way that the protective earthing contact is thereby stabilized. The protective earthing contact can therefore not slip in the direction of the contact surface between the guide contours and the housing and/or between the guide contours and the conductor stops, as these restrict the range of motion of the protective earthing contact.

The protective earthing contact may have a retaining element, wherein the retaining element in the interior of the conductor connection terminal may be arranged in the region of the electrical conductors to be clamped. Furthermore, the busbar may have a recess, wherein the retaining element engages in the recess with the busbar for the form-fitting connection of the protective earthing contact.

In the region of the electrical conductors to be clamped means in particular that the retaining element is arranged above the busbar, so that the busbar is not arranged between the retaining element and the electrical conductors to be clamped. In this way, the existing installation space of the conductor connection terminal can be used to arrange the protective earthing contact in the conductor connection terminal without having to design the conductor connection terminal to be higher. The retaining element is thus arranged in the region of the clamping point for the electrical conductor.

The retaining element can be arranged at the end of the side element facing away from the base portion, namely at the upper region of the side element, wherein the height between the latching region and the retaining element is smaller than the height between the latching region and the base portion.

Smaller means in particular that the overall height between the latching region and the retaining element is a maximum of 90%, but at least 50% smaller than the height between the latching region and the base portion. This has the advantage that the protective earthing contact can be installed in the conductor connection terminal without the need to design the conductor connection terminal larger.

It is conceivable that such a conductor connection terminal may represent an independent subject of the invention, wherein the conductor connection terminal for the form-fitting connection engages in a recess of the busbar, so that a conductor connection terminal can also be provided, which has such a retaining element, but wherein the latching region and the protective earth contact element are not substantially arranged at the same height in relation to the base portion. This would result in a conductor terminal with the following features:

A conductor terminal with a housing, with a busbar, with a spring force terminal connection, wherein the busbar and the spring force terminal connection form a clamping point for an electrical conductor to be clamped, and with an above-mentioned protective earthing contact to the electrically conductive connection of a protective earth line with the busbar, wherein the protective earthing contact has a base portion, wherein two side elements project from the base portion and a respective side element has an upper region, wherein the upper regions form a latching region for clamping the protective earthing contact onto the busbar and wherein at least one side element has a protective earth contact element for making contact with the carrier element in an electrically conducting manner, wherein the protective earthing contact has a retaining element, wherein the retaining element in the interior of the conductor connection terminal is arranged in the region of the electrical conductor to be clamped.

The conductor connection terminal may be designed, for example, to accommodate three or four electrical conductors. It has been shown that, in particular in the lighting industry, three or four conductor connections are required for power supply connectors. With such conductor terminals, the existing installation space can be used to mount the protective earthing contact in the interior of the housing.

Thus, it is also conceivable that the protective earthing contact according to the invention has a plurality of protective earth contact elements. For example, it is conceivable that a protective earth contact element and a retaining element are arranged on each side element on an upper region.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
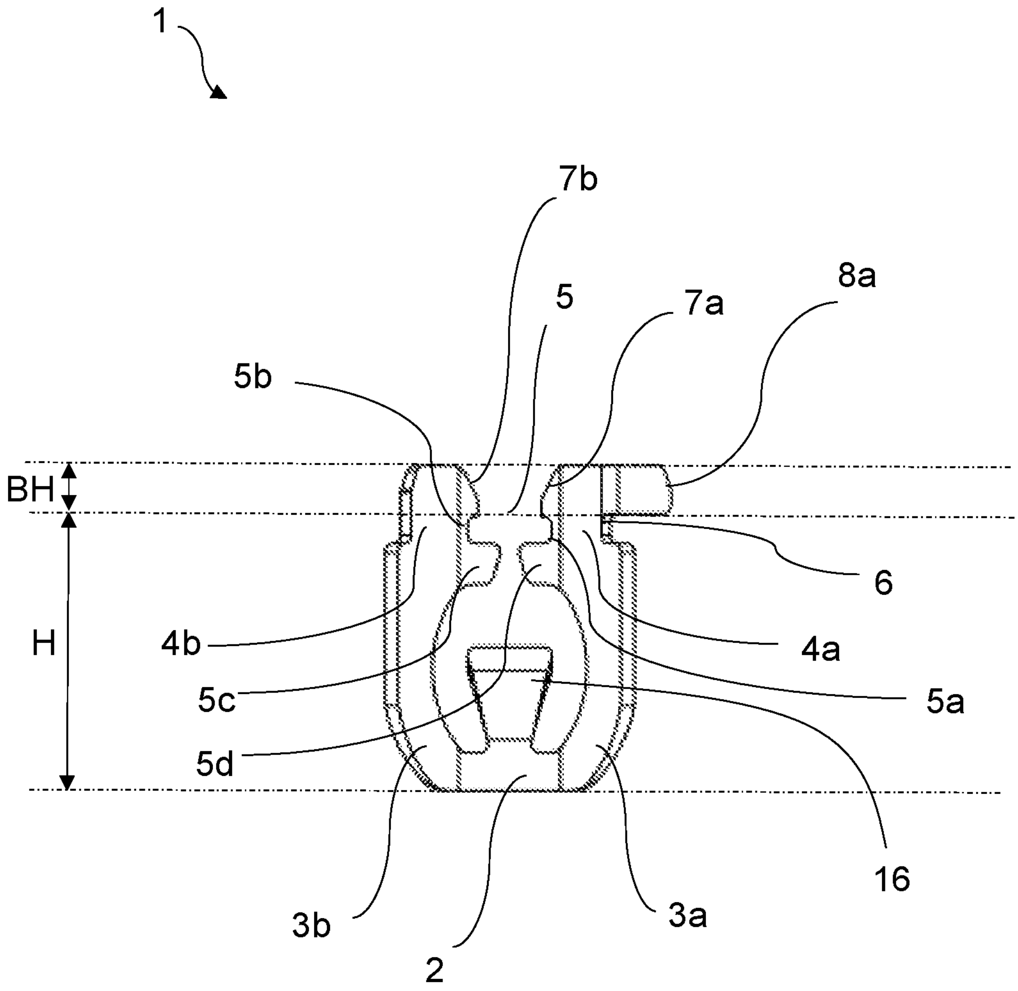
FIG. 1 shows a first example of a protective earthing contact.

FIG. 1 shows a protective earthing contact 1 with a base portion 2, wherein from the base portion two side elements 3*a*, 3*b* project in the same direction, substantially orthogonally from the base portion 2, wherein the side elements 3*a*, 3*b* are connected to each other via the base portion 2. The side elements 3*a*, 3*b* are substantially aligned parallel to each other. The side elements 3*a*, 3*b* each have an upper region 4*a*, 4*b*, wherein the upper regions 4*a*, 4*b* are aligned in such a way that the upper regions 4*a*, 4*b* point to each other. It can be seen that the upper regions 4*a*, 4*b* together form a latching region 5, wherein an electrically conductive carrier element can be guided into the latching region 5. The electrically conductive carrier element may, for example, be designed as a busbar of a conductor connection terminal. On the upper region 4*a* of the side element 3*a*, a protective earth contact element 6 is arranged for electrically conductive contacting of the protective earth conduction with the carrier element.

The carrier element can be held in position in the latching region 5 between contact-making regions 5*a*, 5*b*. For additional securing, in each case a contact stop 5*c*, 5*d* projects directly adjacent to the contact-making regions 5*a*, 5*b* from the upper regions 4*a*, 4*b* of the side elements 3*a*, 3*b*.

It becomes clear that the latching region 5 and the protective earth contact element 6 are substantially arranged at the same height H in relation to the base portion 2 and are also spatially separated from each other. If the carrier element is guided into the latching region 5, the side elements 3*a*, 3*b* in the region of the upper regions 4*a*, 4*b* widens so that the carrier element can be held between the contact-making regions 5a, 5b. Due to the arrangement of the latching region 5 at the same height as the protective earth contact element 6, the protective earth contact element 6 also widens by the same amount. A widening can be done, for example, by the fact that the side elements 3a, 3b are spring-loaded. Once the carrier element reaches its end position between the contact-making regions 5a, 5b, the side elements 3a, 3b in the region of the upper regions 4a, 4b and thus also the protective earth contact element 6 jump back to the starting position, by which the carrier element is held between the contact-making regions 5a, 5b. It is thus possible that a tin-plated protective earth contact element 6, for example, can be guided past the contact surface of the carrier element without contact, so that wear of the tinned protective earth contact element 6 is reduced. The contact surface of the carrier element is the surface with which the protective earth contact element 6 is to come into contact.

It can be seen that at each of the upper regions 4a, 4b a chamfer 7a, 7b is arranged in the region of the latching region 5. The end of the chamfers 7a, 7b facing the contact-making regions 5a, 5b is arranged at the same height as the protective earth contact element 6 in relation to the base portion 2. The chamfers 7a, 7b make it easier to guide the carrier element to the latching region 5. In addition, the side elements 3a, 3b in the region of the upper regions 4a, 4b continuously widen without having to use a correspondingly large force to guide the carrier element between the contact-making regions 5a, 5b.

The protective earth contact element 6 should be exactly at a height with the latching region 5 and the ends of the chamfers 7a, 7b. However, a deviation from this is possible without restricting the function of the protective earthing contact according to the invention. Deviations of 15% are conceivable with regard to the height H of the latching region 5 and to the height H of the protective earthing contact element 6 to the base portion 2.

At the upper end of the side element 3a, a retaining element 8a is arranged on the upper region 4a, wherein the retaining element 8a is set up in the assembled state for the form-fitting connection of the protective earthing contact 1 with the carrier element. The form fit can be achieved, for example, by appropriate recesses on the carrier element. However, recesses on a housing are also conceivable. Due to the form fit, the protective earthing contact 1 is secured against tilting in the assembled state. In order to provide an additional electrically conductive connection, the retaining element 8a can be formed as a protective earth contact element 6.

It becomes clear that the upper regions 4a, 4b, the protective earth contact element 6 and the retaining element 8 are formed in one-piece from the respective side element 3a, 3b.

It is also clear that the overall height BH between the latching region 5 and the retaining element 8a is smaller than the height H between the latching region and the base portion. This has the advantage that the protective earthing contact can be installed in conductor connection terminals without them having to be designed larger.

It can be seen that the protective earthing contact 1 has a contact tongue 16, wherein the contact tongue 16 is designed to connect the protective earthing contact 1 directly or indirectly with a protective earthing line in an electrically conducting manner.

Figure 2:
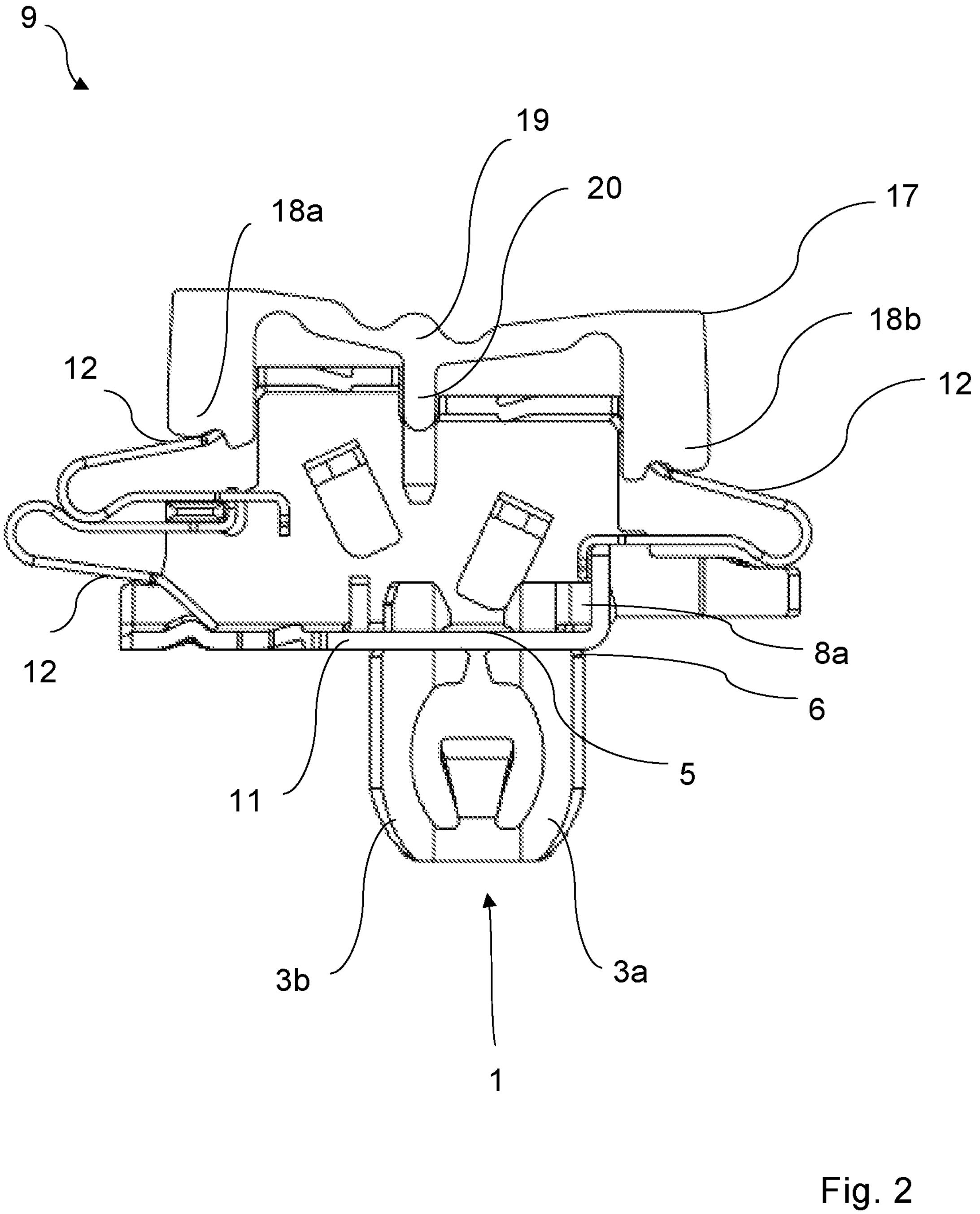
FIG. 2 shows a conductor connection terminal with a protective earthing contact according to FIG. 1 in a sectional view.

FIG. 2 shows a conductor connection terminal 9, in particular a power supply connector for the lighting industry. The conductor connection terminal 9 has a busbar 11 and three spring force terminal connections 12 for clamping three electrical conductors. The protective earthing contact 1 according to FIG. 1 is mounted in the conductor connection terminal 9.

It becomes clear that the contact region of the protective earth contact element 6 to the busbar 11 is arranged separately from the latching region 5, so that the protective earth contact element 6 can be guided contact-free through a recess in the busbar 11. When mounted, a force-locked connection between the protective earth contact element 6 and the busbar 11 is provided. This can be achieved, for example, by designing the dimensions of the recess of the busbar 11 in such a way that the protective earth contact element 6 in the widened state of the side elements 3a, 3b can be passed by the busbar 11 without contact.

It can also be seen that the retaining element 8a in the interior of the conductor connection terminal 9 is arranged in the region of the electrical conductors to be clamped, wherein the busbar 11 is not arranged between the spring force terminal connection 12 and the retaining element 8a. The electrical conductors can therefore be plugged in in the same space of the conductor connection terminal 9 in which the retaining element 8a is in the mounted state. In this way, the available space of the conductor connection terminal 1 is utilized without having to make it larger. The retaining element 8a engages in a recess of the busbar 11 and stabilizes the protective earthing contact 1 against tilting by a form-fitting connection with the busbar 11 in the mounted state. In this way, safe operation can be ensured.

FIG. 2 also shows an actuation arrangement 17, with which on the one hand the upper spring force terminal connection 12 of the arrangement of the two spring force terminal connections 12 (left region) and on the other hand the individual spring force terminal connection 12 (right region) can be manually operated independently of each other in order to deflect the assigned clamping leg and thereby open the clamping point. It can be seen that the actuation arrangement 6 has an actuation section 18a for the one spring force clamp connection 12 and an actuation section 18b for the other, opposite spring force terminal connection 12.

The actuation sections 18a, 18b are connected to each other via a connecting section 19 arranged approximately in the middle between the actuation sections 18a, 18b. At the connecting section 19, between the actuation sections 18a, 18b, e.g., in the middle or slightly off-center between the actuation sections 18a, 18b, a T-shaped projecting material section 20 is present. The T-shaped projecting material section 20 is movable on the busbar 11. Due to the geometric design of the actuation arrangement 6, it is possible to operate the spring force terminal connections 12 independently of each other.

Figure 3:
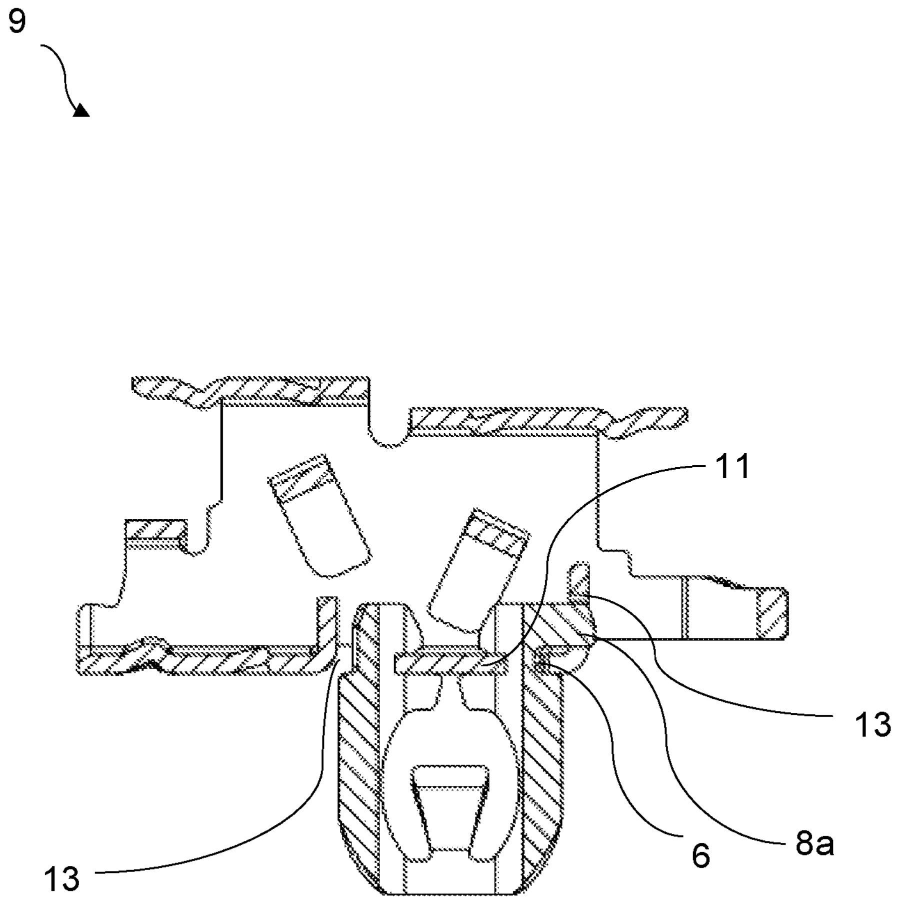
FIG. 3 shows a conductor connection terminal according to FIG. 2 in a sectional view.

FIG. 3 shows the conductor connection terminal 9 according to FIG. 2 in a different sectional view. Here it becomes clear that the busbar has 11 recesses 13 through which the protective earth contact element 6 can be passed for assembly, wherein the protective earth contact element 6 is connected in a force-locked manner and the retaining element 8a is connected in a form-fitting manner to the busbar 11. However, it is also conceivable that the retaining element 8a can be force-locked and the protective earth contact element 6 can be form-fitted to the busbar 11.

Figure 4:
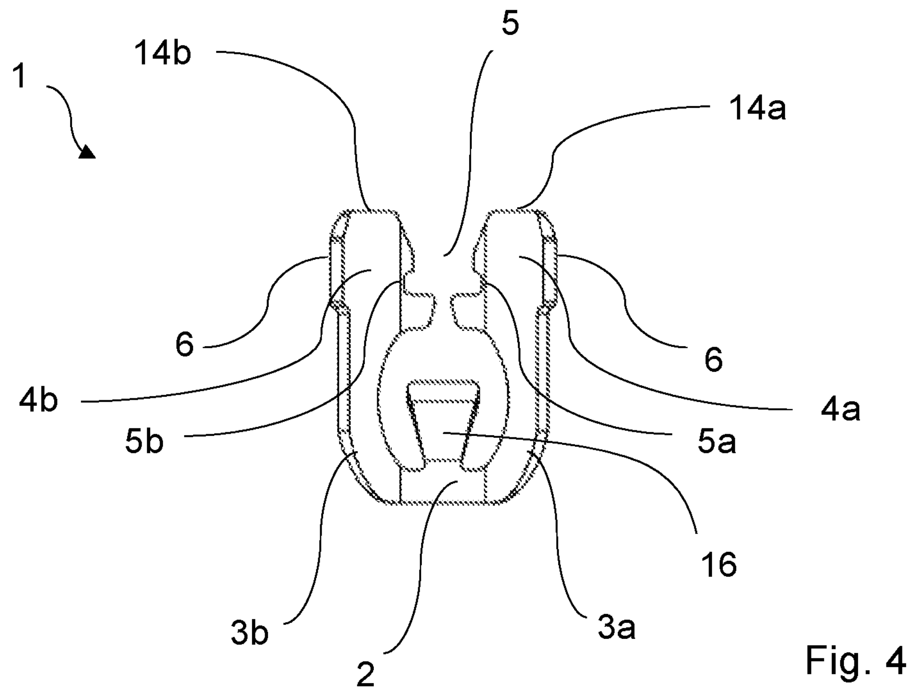
FIG. 4 shows a second example of a protective earthing contact.
Figure 5:
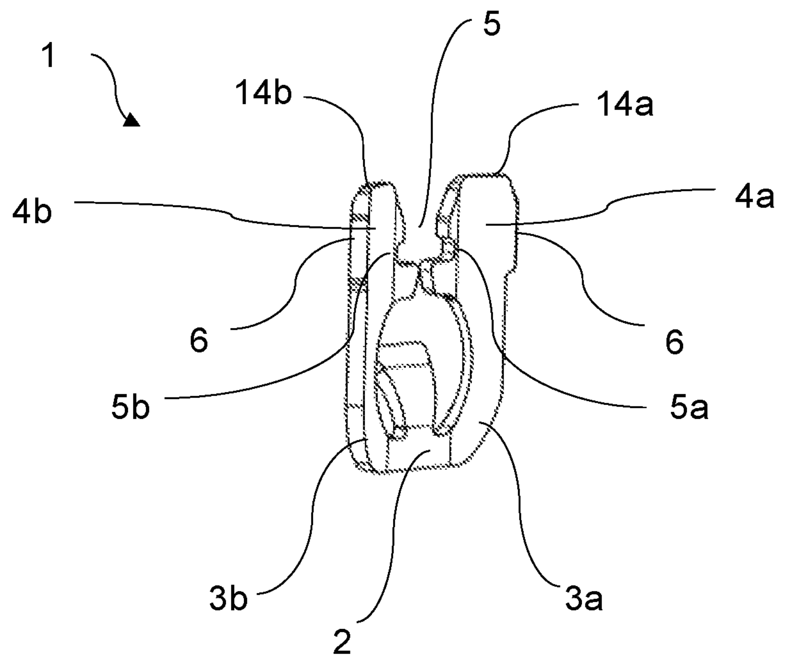
FIG. 5 shows a protective earthing contact according to FIG. 4 in a rotated view.

FIGS. 4 and 5 show a protective earthing contact 1, wherein the protective earthing contact is shown in FIG. 4 in a front view and in FIG. 5 in a rotated view. The protective earthing contact 1 has a base portion 2, with two side elements 3*a*, 3*b* projecting in the same direction from the base portion. The side elements 3*a*, 3*b* each have an upper region 4*a*, 4*b*.

The protective earthing contact has two protective earth contact elements 6, which are arranged at the same height H in relation to the base portion 2 with the latching region 5, so that the protective earth contact elements 6 are widened when installing the protective earthing contact 1 and can thus be inserted contactlessly into a corresponding conductor connection terminal.

It can be seen that the ends of the side elements 3*a*, 3*b* are formed as a guide contour 14*a*, 14*b*. Such guide contours 14*a*, 14*b* have the advantage that these can guide an electrical conductor to the corresponding clamping point in the installed state without the electrical conductor touching the protective earthing contact elements 6.

It can be seen that the protective earthing contact 1 has a contact tongue 16, wherein the contact tongue 16 is designed to connect the protective earthing contact 1 directly or indirectly to a protective earth line in an electrically conducting manner.

Figure 6:
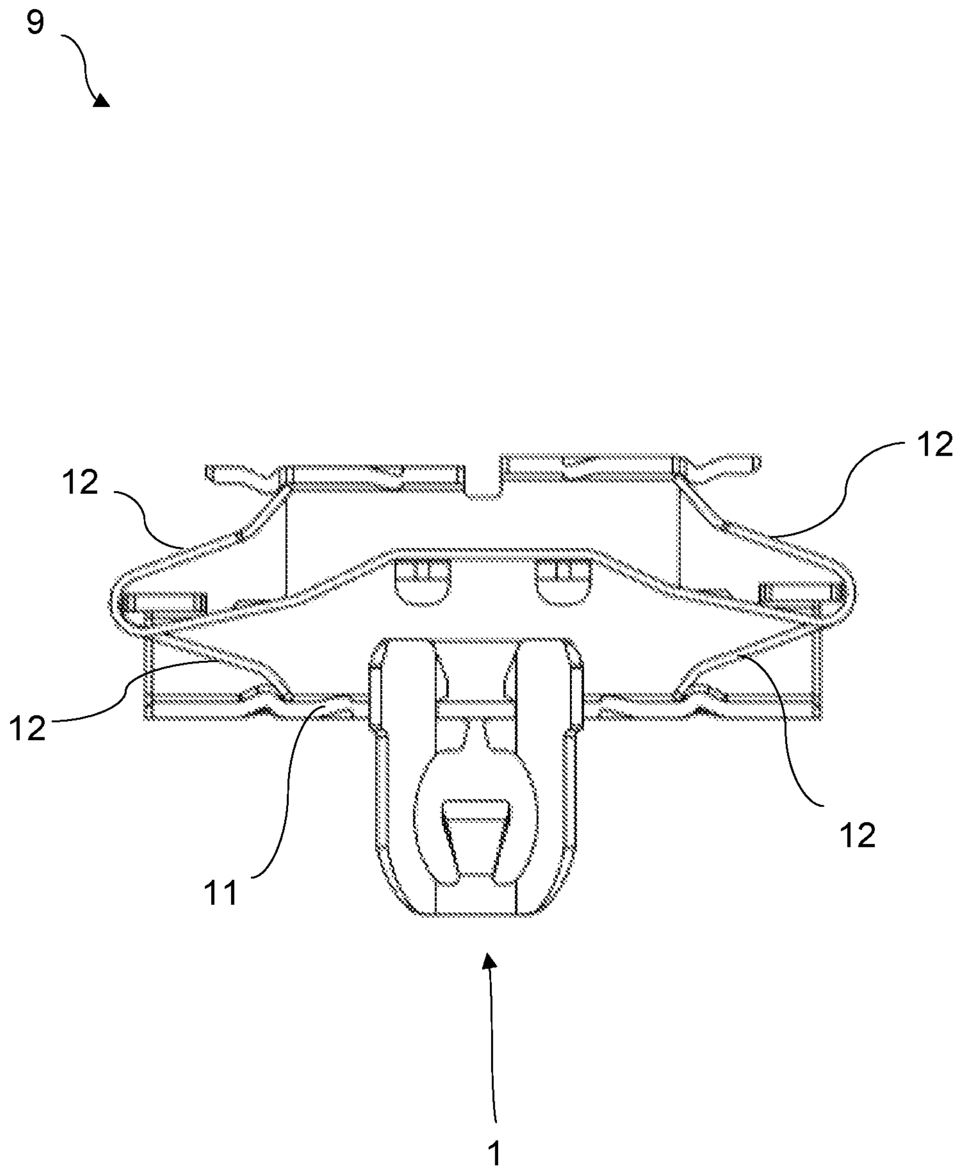
FIG. 6 shows a conductor connection terminal with a protective earthing contact according to FIGS. 5 and 6.

FIG. 6 shows a conductor connection terminal 9, in particular a power supply connector for the lighting industry in a sectional view. The conductor connection terminal 9 has a busbar 11 and four spring force terminal connections 12 for clamping four electrical conductors. The protective earthing contact 1 according to FIGS. 4 and 5 is mounted in the conductor connection terminal 9.

Figure 7:
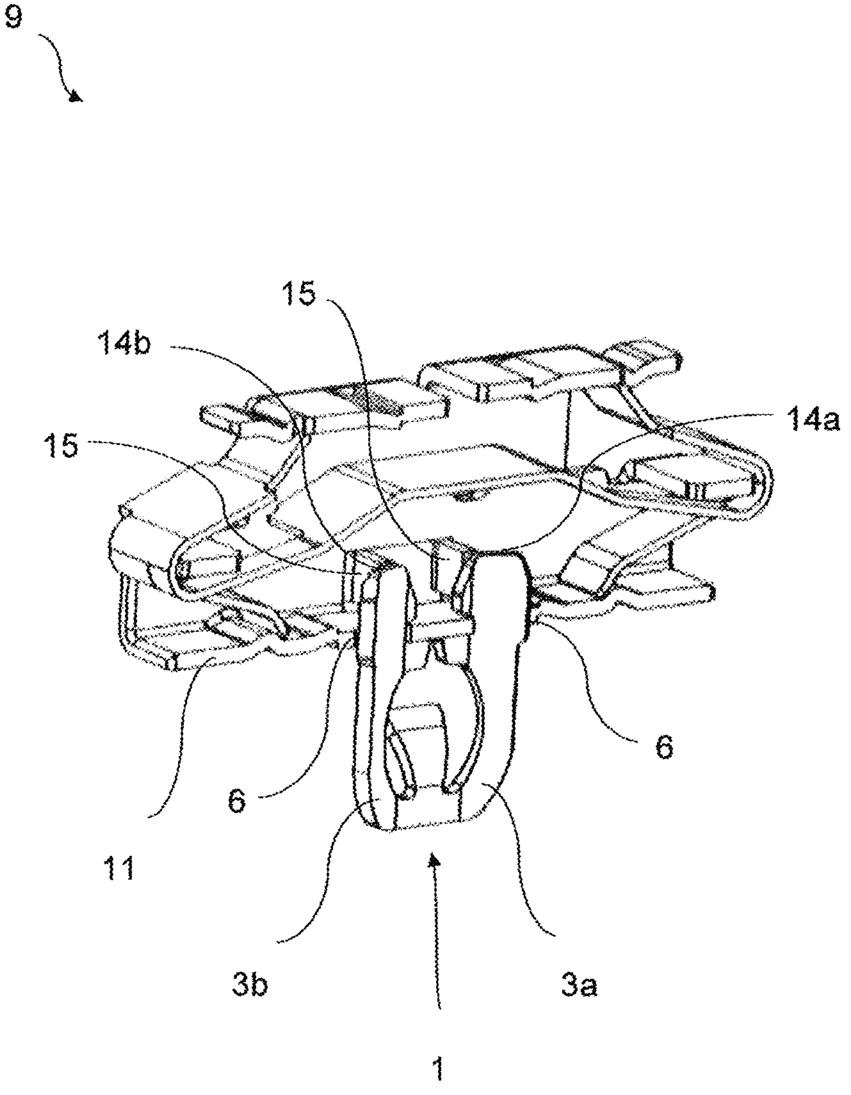
FIG. 7 shows a conductor connection terminal according to FIG. 6 in a rotated view.

FIG. 7 shows the conductor connection terminal 9 according to FIG. 6 in a rotated view. It becomes clear that the conductor connection terminal has 9 conductor stops 15 for electrical conductors to be clamped. It is also clear that the protective earthing contact 1 uses the existing contours and the available space of the busbar 11 of the conductor connection terminal 9, so that the interior of the conductor connection terminal does not have to be designed larger to accommodate the protective earthing contact 1.

The guide contours 14*a*, 14*b* are attached to the conductor stops 15 in such a way that the entire protective earthing contact 1 is stabilized so that it is secured against tilting. The possibility of the protective earthing contact 1 moving is thus limited in the direction of the conductor stops 15.

Figure 8:
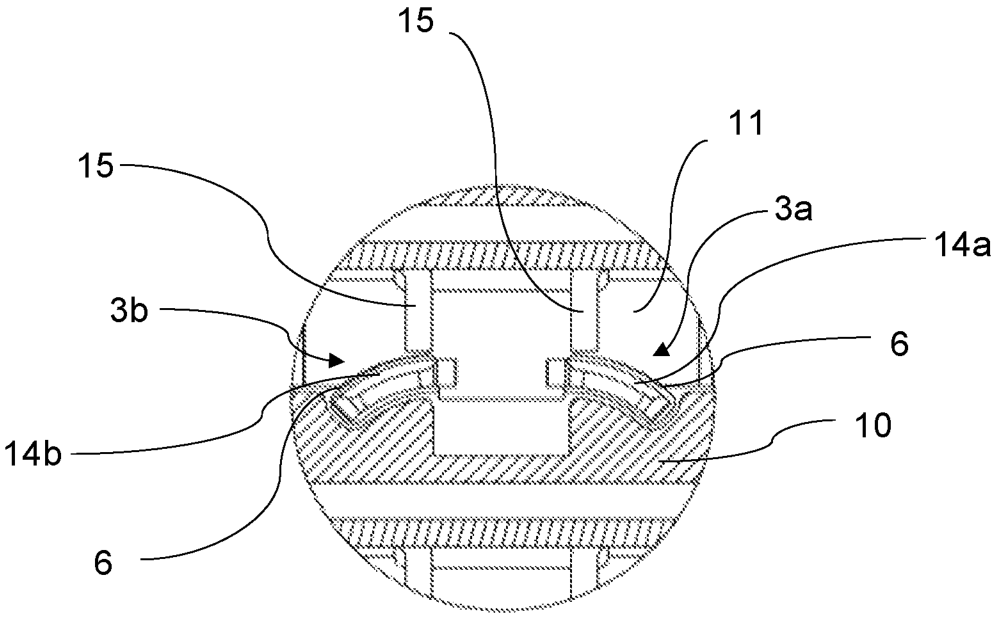
FIG. 8 shows a section of a conductor connection terminal according to FIGS. 6 and 7 in a top view.

FIG. 8 shows a section of the conductor connection terminal 9 according to FIGS. 6 and 7 in a top view. The side elements 3*a*, 3*b* with the guide contours 14*a*, 14*b* of the protective earthing contact 1 can be seen. It becomes clear that the guide contours 14*a*, 14*b* can guide electrical conductors to the conductor stops 15 without the electrical conductors touching the protective earth contact elements 6, since the protective earth contact elements 6 are arranged on a side facing away from the conductor stops 15.

The protective earthing contact 1 can therefore be designed in such a way that the electrical conductors do not collide with the protective earthing contact elements 6 when connected. However, such a design is also conceivable without guide contours 14*a*, 14*b*, for example by one or more protective earth contact elements 6 projecting at right angles from the side element 3*a* and/or from the side element 3*b*. There does not have to be an exact right angle of 90°. A deviation of 25° in the positive or negative direction is conceivable.

Furthermore, it becomes clear that the guide contours 14*a*, 14*b* interact with the contour of a housing 10, so that the protective earthing contact 1 is additionally stabilized. The protective earthing contact 1 is thus stabilized by the conductor stops 15 and the housing 10 and secured against tilting by limiting it in its degrees of freedom by the housing 10 and by the conductor stops 15.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A protective earthing contact for connecting a protective earth line to an electrically conductive carrier element in an electrically conducting manner, the protective earthing contact comprising:

a base portion;

two side elements projecting from the base portion, each of the two side elements having an upper region that together form a latching region therebetween for clamping the protective earthing contact onto the carrier element, and at least one of the two side elements having a protective earth contact element that contacts the carrier element in an electrically conducting manner, the protective earth contact element being formed of a surface that faces away from the latching region; and a contact-making region provided in each upper region of the two side elements, wherein the latching region and the protective earth contact element are arranged substantially at the same height in relation to the base portion, wherein each of the contact-making regions is formed of a surface, with the surface of a first one of the contact-making regions facing the surface of the second one of the contact-making regions, with the latching region being provided therebetween, and wherein a portion of the carrier element is inserted between the surfaces of the contact-making regions such that the surfaces of the contact-making regions contact the portion of the carrier element to clamp the portion of the carrier element therebetween in the latching region.

2. The protective earthing contact according to claim 1, wherein at least one of the upper regions has a chamfer in a region of the latching region, and wherein an end of the chamfer facing the contact-making regions and the protective earth contact element are substantially arranged at the same height in relation to the base portion.

3. The protective earthing contact according to claim 1, wherein the protective earth contact element is formed for a form-fitting connection with the carrier element.

4. The protective earthing contact according to claim 3, wherein the protective earthing contact has a retaining element for the form-fitting connection of the protective earthing contact with the carrier element in an assembled state, wherein the retaining element is separate from the contact-making regions.

5. The protective earthing contact according to claim 4, wherein the retaining element is arranged on the upper region of one of the two side elements.

6. The protective earthing contact according to claim 5, wherein a height between the latching region and the retaining element is smaller than the height between the latching region and the base portion.

7. The protective earthing contact according to claim 4, wherein the retaining element is arranged on one of the two side elements.

8. The protective earthing contact according to claim 1, wherein at least one of the two side elements has a guide contour for guiding an electrical conductor.

9. The protective earthing contact according to claim 8, wherein the guide contour is arranged on the upper region of the at least one of the two side elements.

10. The protective earthing contact according to claim 1, wherein a contact stop is provided on the upper region of each of the two side elements for stabilization of the protective earthing contact in an assembled state.

11. The protective earthing contact according to claim 10, wherein the contact stops project from the respective upper region such that the contact stops are substantially aligned parallel to each other.

12. The protective earthing contact according to claim 11, wherein the contact stops of the upper regions of the two side elements protrude towards each other.

13. A conductor connection terminal comprising:

a housing;

a busbar;

a spring force terminal connection;

a clamping point formed by the busbar and the spring force terminal connection for an electrical conductor to be clamped; and a protective earthing contact according to claim 1 for the electrically conductive connection of a protective earth line to the busbar, wherein the busbar is the conductive carrier element.

14. The conductor connection terminal according to claim 13, wherein at least one of the upper regions has a chamfer in a region of the latching region, wherein an end of the chamfer facing the contact-making regions and the protective earth contact element are arranged at the same height in relation to the base portion.

15. A conductor connection terminal comprising:

a housing;

a busbar;

a spring force terminal connection;

a clamping point formed by the busbar and the spring force terminal connection for an electrical conductor to be clamped; and a protective earthing contact for an electrically conductive connection of a protective earth line to the busbar, wherein the protective earthing contact has a base portion, wherein two side elements project from the base portion, each of the two side elements having an upper region, wherein the upper regions together form a latching region for clamping the protective earthing contact onto the busbar, wherein at least one of the two side elements has a protective earth contact element for making contact with the busbar in an electrically conducting manner, wherein each upper region of the two side elements has a contact-making region, wherein the latching region and the protective earth contact element are substantially arranged at the same height in relation to the base portion, and wherein at least one of the two side elements has a guide contour for guiding the electrical conductor into the housing.

16. The conductor connection terminal according to claim 15, wherein the guide contour is arranged on the upper region of the at least one of the two side elements.

17. The conductor connection terminal according to claim 15, wherein the guide contour is in interaction with the housing and/or with a conductor stop for the electrical conductor such that the protective earthing contact is stabilized.

18. A conductor connection terminal comprising:

a housing;

a busbar;

a spring force terminal connection;

a clamping point formed by the busbar and the spring force terminal connection for an electrical conductor to be clamped; and a protective earthing contact for an electrically conductive connection of a protective earth line to the busbar, wherein the protective earthing contact has a base portion, wherein two side elements project from the base portion, each of the two side elements having an upper region, wherein the upper regions together form a latching region for clamping the protective earthing contact onto the busbar, wherein at least one of the two side elements has a protective earth contact element for making contact with the busbar in an electrically conducting manner, wherein each upper region of the two side elements has a contact-making region, wherein the latching region and the protective earth contact element are substantially arranged at the same height in relation to the base portion, and wherein the protective earthing contact has a retaining element, wherein the retaining element is arranged in the interior of the conductor connection terminal in a region of the electrical conductor to be clamped.

19. The conductor connection terminal according to claim 18, wherein the busbar has a recess, wherein the retaining element engages in the recess for a form-fitting connection of the protective earthing contact to the busbar.

* * * * *